Oct. 31, 1967

W. H. KASSMEIER 3,350,117

DRAWBAR PIN

Filed Feb. 25, 1966

INVENTOR
WILLIAM H. KASSMEIER

BY *Larson and Taylor*

ATTORNEYS

INVENTOR
WILLIAM H. KASSMEIER
BY *Larson and Taylor*
ATTORNEYS

3,350,117
DRAWBAR PIN
William H. Kassmeier, West Point, Nebr., assignor to Overland Products Company, Inc., Fremont, Nebr., a corporation of Nebraska
Filed Feb. 25, 1966, Ser. No. 530,227
9 Claims. (Cl. 280—515)

This invention relates generally to devices for releasably connecting two aligned apertured members, and more specifically it relates to improved devices commonly known as drawbar pins or hitch pins for releasably connecting the drawbar of a tractor, for instance, to the tongue of a drawn vehicle or implement.

It is a general object of the invention to provide a drawbar pin assembly which can be removed by the tractor operator without leaving the tractor seat, while at the same time avoiding the possibility of the drawbar pin jarring loose during use because of the inherent variable relative movement and separating forces between the drawbar and the tongue of the drawn vehicle.

It is a more specific object of the invention to provide such a drawbar pin assembly wherein the drawbar pin is locked to or released from the drawbar by a locking assembly which utilizes a sliding principle or a combination sliding and pivoting principle rather than the simple pivoting principles which are generally characteristic of the prior art.

It is a further object of the invention to provide such a drawbar pin assembly incorporating a positive locking but easily releasable locking assembly, the locking assembly being so constructed as to provide for unlocking of the locking assembly and retraction of the drawbar pin from the drawbar by a single upward pull which can be accomplished remotely by the operator from the tractor seat.

Toward accomplishing these objects, the invention basically comprises a conventional drawbar pin, a curved arm fixed to an upper part of the pin and extending outwardly and downwardly from the upper part of the pin so as to define with the pin an open-bottom perimeter, and a locking arm arrangement slidably mounted on the arm so as to slide down the arm and move inwardly toward the lower part of the pin to close the open perimeter, and so as to slide up the arm and retract outwardly from the pin so as to open the perimeter. Preferably the retracting movement is accomplished by utilizing the curvature of the arm as a cam surface to urge the lower part of the locking arm pivotally outwardly away from the pin, and in the preferred embodiment of the invention there is provided a selectively operable mechanism for permitting or preventing this outward pivotal movement, thus selectively permitting or preventing release or unlocking of the drawbar pin assembly from the drawbar upon which it is mounted. Finally, in accordance with the preferred embodiment of the invention, this selectively operable mechanism is so constructed that by a single upward pull from the tractor seat the mechanism will move upwardly to unlock the locking arm so as to free it for pivoting movement, the locking arm will slide up the fixed arm and at the same time pivot outwardly to open the bottom of the perimeter, and the unlocked drawbar pin can be completely removed from the drawbar, all of this being accomplished by a single upward pull.

Other and further objects, advantages and features of the invention will be apparent to persons skilled in the art and armed with a general understanding of the principles of the invention and a knowledge of a preferred embodiment of the invention.

I have set forth with particularity in the appended claims those novel features which I consider characteristic of my invention, but the invention itself, its structure, operation, advantages, and rearrangements or modifications, will be best understood from the following description of the presently preferred embodiment of the invention taken in conjunction with the illustrations shown in the accompanying drawings, wherein, FIGURE 1 is a perspective view of the presently preferred embodiment of the invention mounted in locked position connecting a conventional drawbar to a conventional clevis type vehicle tongue;

Figure 1:
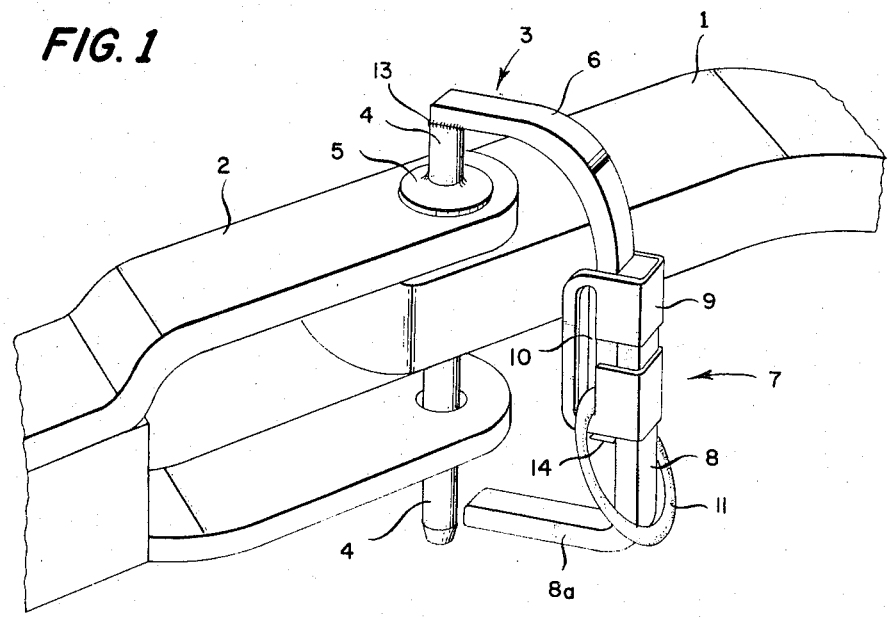
Figure 2:
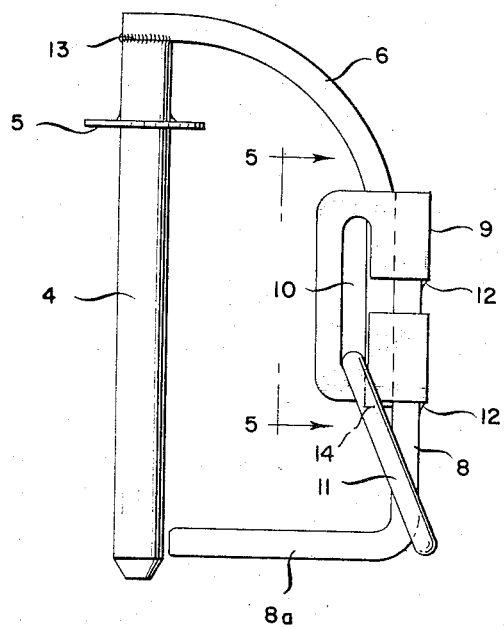
FIGURE 2 is a side elevation of the preferred embodiment in the locked position.

Referring first to FIGURE 1 of the drawings, a conventional drawbar 1 is connected to a conventional clevis type tongue 2 by the preferred embodiment of the invention generally indicated by reference character 3. The drawbar pin 4 passes down through the aligned holes in the drawbar and the tongue and is retained against further downward movement by a seating washer 5 which is usually spotwelded to the pin 4. A fixed curved upper arm 6 is connected at 13 (FIGURE 2) by welding or other suitable means to the top of the pin 4 and extends outwardly and downwardly from the top of the pin, terminating in a flared lower end 14, which is shown more clearly in FIGURES 5 and 6. The arm 6 thus forms with the pin 4 an open-bottom perimeter which is shown in FIGURES 1 and 2 as being closed by locking arm 8 and an inwardly extending portion 8a of the locking arm. The upper arm 6 is shown in FIGURES 2–4 as having a substantially straight section above its flared end 14.

Figure 5:
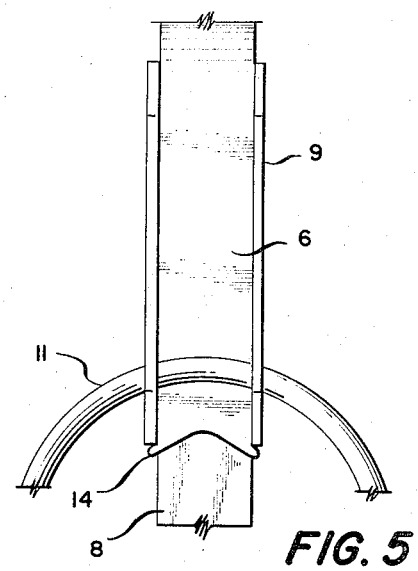
FIGURE 5 is a detailed view taken along line 5—5 of FIGURE 2.
Figure 6:
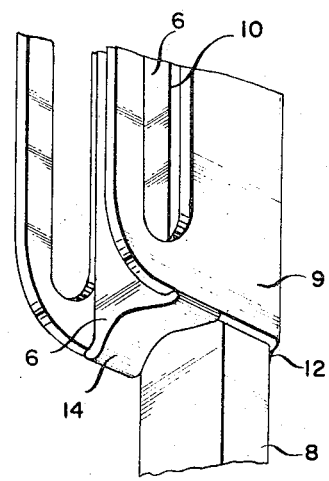
FIGURE 6 is a fragmentary detailed view of part of the locking arm assembly located at the bottom of the fixed arm, this position corresponding to the position shown in FIGURES 1 and 2.

The movable locking arm assembly is generally designated by reference character 7 and includes the locking arm 8, the inwardly extending portion 8a, a locking arm guide 9 which is welded to the locking arm 8 at points 12, and a locking and releasing ring 11 which is freely mounted in slots 10 formed in the locking arm guide adjacent the inner face of the fixed arm 6 as viewed in FIGURE 2. The locking arm 8 has a substantially straight section which bears slidably against the outer face of the fixed arm 6, and the slidable mounting of the locking arm assembly on the fixed arm 6 is completed by the ring 11 where it passes through the slots 10 to slidably embrace the inner face of the fixed arm 6. The ring 11 is movable in slot 10 relative to the guide 9 and the fixed arm 6, the normal position of the ring being at the bottom of the slot as shown in FIGURES 1 and 2. In its lowermost position the locking arm assembly is retained on the fixed arm 6 by the flared end 14 of the fixed arm, as illustrated in FIGURES 5 and 6.

With the locking arm assembly in the lowermost position as shown in FIGURES 1 and 2 a substantially closed perimeter is formed by the pin 4, the fixed arm 6, the locking arm 8, and the inwardly extending portion 8a. The drawbar pin accordingly is locked to the drawbar and the aligned tongue. With ring 11 disposed in the bottom of the slot 10 as shown in FIGURE 2, obviously the locking arm 8 and the inwardly extending portion 8a cannot retract or pivot outwardly from the pin 4 to open the perimeter. In the same manner, they cannot pivot inwardly toward the pin since this is prevented by the pin 4 itself and by that portion of the fixed arm 6 which lies between the ring 11 and the locking arm 8. In essence, with the ring 11 positioned as shown in FIGURE 2 the locking arm assembly cannot pivot substantially in either direction. The locking arm assembly is capable of a limited upward sliding movement, but since there can be no substantial pivotal movement the upward sliding movement would be limited by the inwardly extending portion 8a striking against the flared end 14 of the fixed arm 6. Such a limited upward sliding movement of course is not objectionable since it cannot release the drawbar pin from the drawbar. Thus with the ring 11 in the down position the locking is positive and the locking arm assembly cannot be pulled open.

Figure 3:
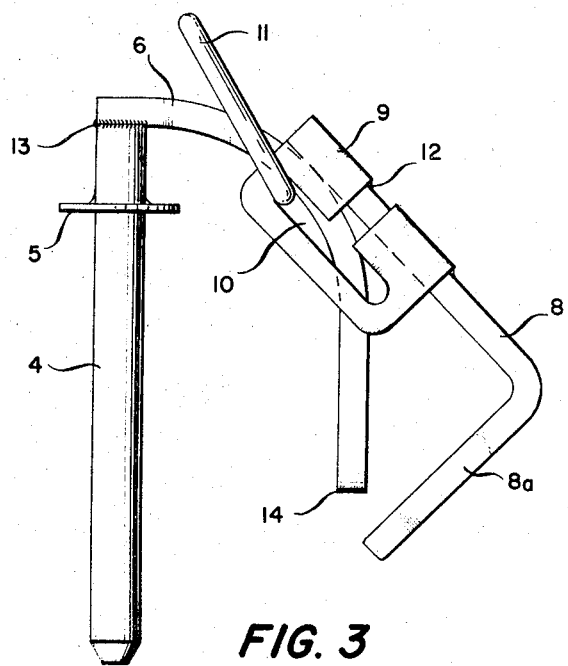
FIGURE 3 is a view corresponding to FIGURE 2 but showing the position assumed by the locking arm at an intermediate point in its movement along the fixed curved arm during the removal operation.
Figure 4:
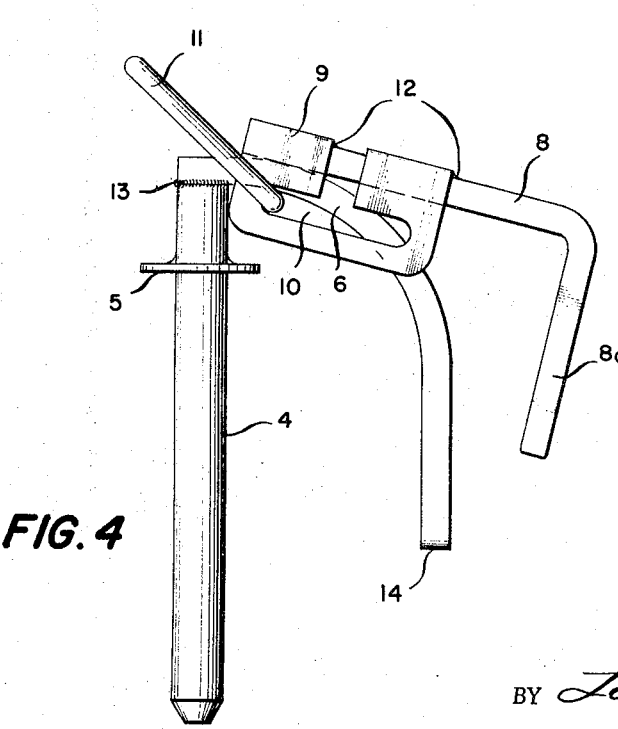
FIGURE 4 is a view corresponding to FIGURE 3 but showing the locking arm at the uppermost point of its travel up the fixed curved arm during the removal operation, the drawbar pin itself then being easily removable from the drawbar through continuation of the same upward pull.

The removal or releasing operation will be clear from FIGURES 3 and 4. When it is desired to remove the drawbar pin from the drawbar, it is necessary merely to grasp the ring 11 and pull it upwardly. This moves the ring to the top of the slot 10 and the positive lock is released, although the locking arm assembly still is not completely free to pivot outwardly without continued upward movement since it still embraces the inner and outer faces of the fixed arm 6 on one side by the ring 11 and on the other side by the locking arm 8. Continued pull on the ring 11 moves the locking arm assembly up the fixed arm 6, the curvature of the fixed arm acting in essence as a cam to pivot the lower part of the locking arm assembly outwardly away from the pin 4 as illustrated in FIGURE 3, thus opening the bottom perimeter and moving the inwardly extending portion 8a clear of the bottom 14 of the fixed arm 6. This continues until the locking arm assembly reaches the position shown in FIGURE 4, at which position the locking arm assembly is completely out of the way and the ring 11 is in the correct position so that further pulling removes the pin from the drawbar. By extending a rope from the ring 11 to the tractor seat the entire removal operation can be accomplished by the operator without leaving the tractor seat.

To install the device so as to connect a drawbar and a tongue, it is necessary merely to move the locking arm assembly to the position shown in FIGURE 4 and to insert the drawbar pin 4 through the aligned holes. The locking arm assembly when released automatically slides down the fixed arm 6 and pivots inwardly to its perimeter-closing position, the ring 11 also automatically falling to the bottom of the slot 10 to effect the positive locking.

As previously stated, the embodiment of the invention described herein and illustrated in the drawings is the presently preferred embodiment, but obviously the illustrated and described embodiment is susceptible of various re-arrangements and modifications without departing from the scope and the spirit of the invention itself. Thus instead of having the locking arm guide 9 pass around the lateral sides of the upper arm 6, the arm 6 could be slotted longitudinaly along its length between the inner and outer faces, and a single guide member could be provided to pass through this slot and form a single slot adjacent the inner face of the curved arm corresponding to the slots 10 of the illustrated embodiment. Such a modified embodiment would operate in the same manner as the illustrated embodiment, but the locking arm guide then would take the general form of an elongate loop passing through the slotted arm and forming an elongate slot for the ring 11. Also, there could be provided if desired in the illustrated embodiment a fixed member at the upper ends of slots 10 to bear against the inner surface of the fixed arm 6 for guiding the locking arm assembly around the curved portion of the arm, the ring 11 still serving as a positive lock in its downward position and moving upwardly in the slots 10 to release the positive lock. Any equivalent member could be incorporated in place of the ring 11 without affecting the positive locking feature, and if desired a spring connection could be provided between this member and some other point on the locking arm assembly so as to bias the member continuously toward the locking position at the bottom of the slot or slots. The relative dimensions and configuration of the parts of the overall assembly can be adapted to the requirements of a particular situation or problem. Furthermore, while the positive locking feature of the preferred embodiment is a preferred feature of the invention itself so as to limit both outward and upward movement of the locking arm assembly, for uses where positive locking to this extent is not required, it is within the scope of the invention to provide a less positive locking of the invention by arranging the fixed arm 6 and the locking arm assembly so that the locking arm assembly can not pivot outwardly while disposed at the bottom of the fixed arm but can pivot outwardly after predetermined sliding movement up of the fixed arm, thus relying upon the resistance to upward movement of the locking arm assembly to prevent release of the drawbar pin. This modification in essence would involve incorporating a member corresponding to ring 11 at a position along the locking arm guide so as to engage the inner curved surface of the fixed arm and cam the locking arm assembly outwardly after a predetermined upward movement, the amount of upward movement being determined by the curvature of the fixed arm and the location on the locking arm assembly of this camming member. It is of course apparent from the illustrated embodiment that the required amount of upward movement before outward pivoting can occur is dependent upon the position of ring 11 in slot 10 and the configuration of fixed arm 6, and the basic concept of the positive locking feature of the preferred embodiment is to so arrange these two variables as to make it impossible to move the locking arm assembly upwardly a sufficient distance to permit outward pivoting to occur. Accordingly, the invention encompasses in various degrees of scope the sliding-pivoting release arrangement of the fixed arm and the locking arm assembly, the further combination therewith of the selectively releasable positive locking feature, and the further incorporation therein of the arrangement to permit remote unlocking and withdrawal of the entire assembly from the drawbar upon which it may be mounted. It sould be understood therefore that the foregoing description and illustrations are to be considered as merely exemplary of the invention, and that the scope of the invention is as defined in the subjoined claims interpreted and construed in the light of the foregoing description and illustrations.

Having thus described my invention in the manner required by the patent statues, I claim:

1. A drawbar pin assembly comprising a drawbar pin, a curved arm fixed to the upper part of the pin and extending outwardly and downwardly therefrom to form with said pin an open-bottom perimeter, and locking arm means slidably connected to said curved arm for automatically extending inwardly toward said pin to substantially close said perimeter when said locking arm means moves slidingly along said curved arm to the lower end thereof, and for retracting away from said pin to open the perimeter when the locking arm means moves slidingly along said curved arm toward the upper fixed end thereof, said locking arm means comprises a locking arm assembly having a first portion slidably mounted on said curved arm and having a second portion which extends inwardly toward the lower part of said pin when said slidably mounted portion is located along the lower portion of said curved arm, said slidably mounted portion extending from the outer surface of said curved arm inwardly past the inner surface of the curved arm and having elongate slot means formed in the part thereof which extends past the inner curved surface, said slot means extending generally in the direction of the pin axis when the locking arm assembly is located toward the lower end of said curved arm, a member mounted in said slot means for movement along the length of said slot means and disposed closely adjacent the inner surface of said curved arm, the dimensions of said slot means relative to the configuration of said curved arm being such that the locking arm assembly can slide along said curved arm toward the upper end thereof and retract outwardly from the pin to open said perimeter only when said movably mounted member is moved from the lower end of the slot means toward the upper end thereof, whereby the locking arm assembly can be locked in the perimeter closing position by moving said movable member to the bottom of said slot.

2. A drawbar pin assembly as set forth in claim 1 further comprising selectively operable means for preventing or permitting said movement of said locking arm means from the lower end to the upper fixed end of said arm and outwardly from the pin to open said perimeter.

3. A drawbar pin assembly as set forth in claim 1 wherein said locking arm means comprises a mounting portion slidably disposed on said curved arm, a connecting portion depending downwardly from said mounting portion when said mounting portion is disposed at the lower end of said curved arm, and a closing portion extending inwardly to the vicinity of the lower end of said pin when said mounting portion is disposed at the lower end of said curved arm, and selectively operable means for causing said locking arm means to pivot outwardly away from said pin to open said perimeter as said mounting portion slides upwardly toward the fixed end of said curved arm, or for preventing said locking arm means from pivoting outwardly to open said perimeter as said mounting portion slides upwardly toward the fixed end of said curved arm.

4. A drawbar pin assembly as set forth in claim 3 wherein said mounting portion bears against the outer surface of said curved arm and extends inwardly past the inner surface thereof, and wherein said selectively operable means comprises elongate slot means formed in said mounting portion inwardly of and adjacent to the inner surface of said curved arm and extending generally in the direction of the adjacent inner surface of the curved arm, and a selectively movable member mounted in said slot means for permitting or preventing said pivoting movement of said locking arm means upon upward sliding movement thereof, depending upon the position of said movable member.

5. A drawbar pin assembly as set forth in claim 4 wherein said movable member comprises a ring passing through said slot means and loosely around said curved arm and said mounting portion, whereby an upward pull on said ring first moves the ring upwardly in said slot and then pulls said locking arm means upwardly along said curved arm to cause outward pivotal movement of said locking arm means and thus opening of said perimeter.

6. A drawbar pin assembly comprising a drawbar pin, a curved arm fixed to the upper part of the pin and extending outwardly and downwardly therefrom to form with said pin an open-bottom perimeter, and locking arm means slidably connected to said curved arm for automatically extending inwardly toward said pin to substantially close said perimeter when said locking arm means moves slidingly along said curved arm to the lower end thereof, and for retracting away from said pin to open the perimeter when the locking arm means moves slidingly along said curved arm toward the upper fixed end thereof, said locking arm means includes a movable locking-and-releasing member, means movably mounting said locking and-releasing member and defining a normal locking position therefor comprising at least one slot formed in said locking arm means closely adjacent to and extending generally in the direction of the lower portion of the curved arm when the locking arm means is in the perimeter-closing position in which the member prevents retraction of said locking arm means away from said pin, and a releasing position in which said member acts against a curved surface of said curved arm to cause retraction of said locking arm away from said pin upon upward sliding movement of the locking arm means along said curved arm.

7. A drawbar pin assembly as set forth in claim 6 wherein the lower end of said slot defines said normal locking position and the upper end defines said releasing position, whereby an upward pull on said locking-and-releasing member when in the normal locking position moves the member up said slot to the releasing position, and then moves the locking arm means up said curved arm and retracts it outwardly from said pin to open said perimeter, and then exerts an upward pull on said pin to remove it from a drawbar in which it may be mounted.

8. A drawbar pin assembly comprising a drawbar pin, a curved arm fixed to the upper part of the pin and extending outwardly and downwardly therefrom to form with said pin an open-bottom perimeter, and locking arm means slidably connected to said curved arm for automatically extending inwardly toward said pin to substantially close said perimeter when said locking arm means moves slidingly along said curved arm to the lower end thereof, and for retracting away from said pin to open the perimeter when the locking arm means moves slidingly along said curved arm toward the upper fixed end thereof, said curved arm curves outwardly and downwardly from the upper part of the pin and includes a substantially straight section adjacent the lower end of the arm, and wherein said locking arm means considered in its perimeter-closing position has a substantially straight section slidably engaging the outer surface of the straight section of the curved arm, and means for selectively slidably connecting said locking arm means to the inner surface of the arm at points spaced longitudinally along the straight section of the locking arm means so as selectively to permit the lower part of the locking arm means to pivot outwardly away from said pin as the locking arm means slides up the curved portion of said arm, or so as selectively to prevent outward pivoting of the lower part of the locking arm means, whereby the locking arm means can be selectively locked in or released from the perimeter-closing position.

9. A drawbar pin assembly as set forth in claim 8 wherein said means for slidably connecting said locking arm means to the inner surface of said arm comprises a member connected to said straight section of said locking arm and extending inwardly past the inner surface of the curved arm and movably supporting a movable locking-and-releasing member in sliding engagement with the inner surface of said arm for selective movement between a lower locking position to prevent outward pivoting of the locking arm means and an upper releasing position for permitting outward pivoting thereof.

References Cited

UNITED STATES PATENTS 2,436,210    2/1948    Fuhrer et al. _____ 280—515 X

FOREIGN PATENTS 1,097,290    1/1961    Germany.
  164,458    8/1958    Sweden.
  169,461   11/1959    Sweden.

BENJAMIN HERSH, *Primary Examiner.*

CHARLES C. PARSONS, *Assistant Examiner.*